March 31, 1970  J. L. HEINLEIN  3,503,271
MOWING MACHINE DRIVE
Filed May 27, 1968  2 Sheets-Sheet 1
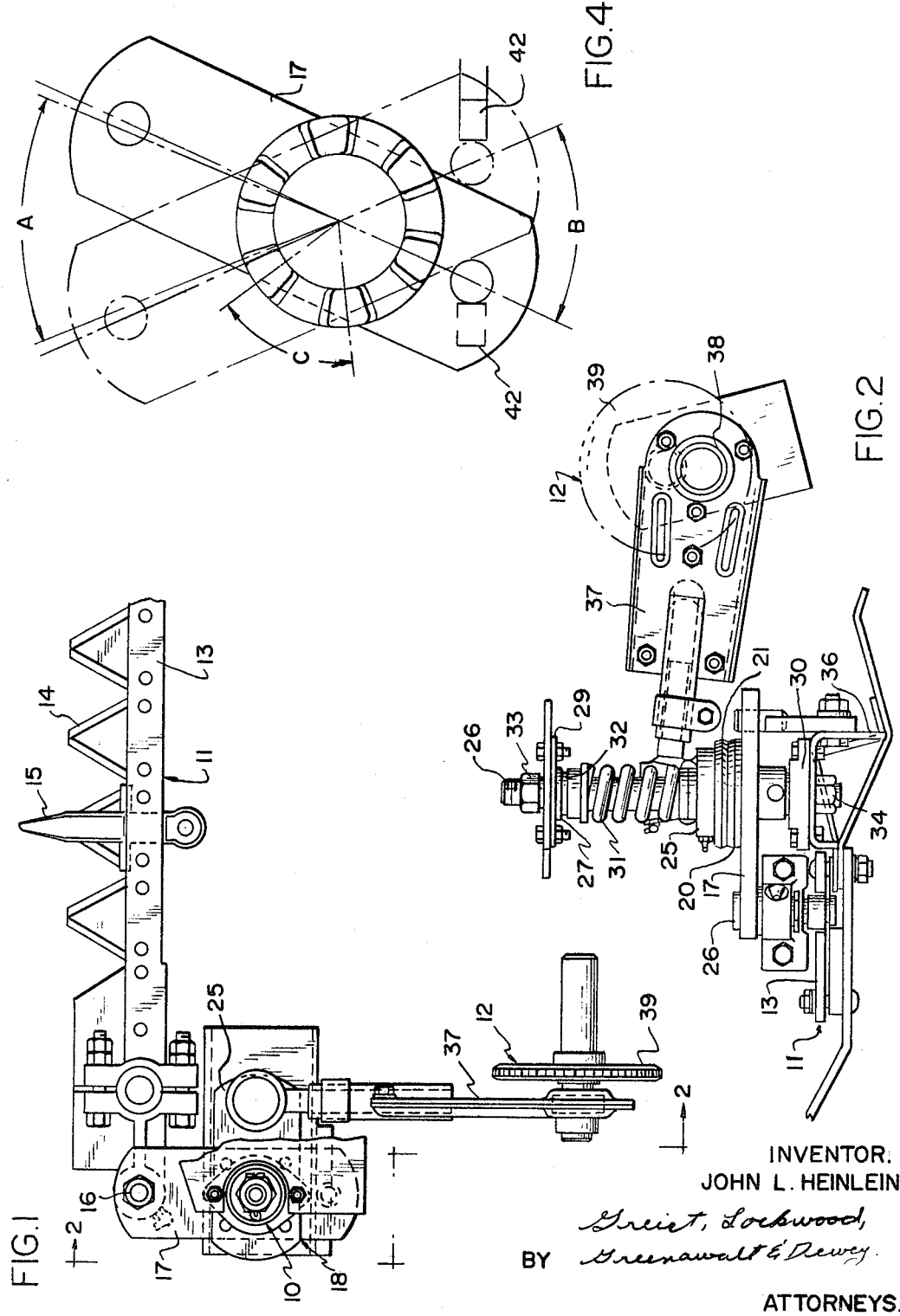
INVENTOR:
JOHN L. HEINLEIN
BY Griest, Lockwood,
Greenawalt & Dewey
ATTORNEYS.

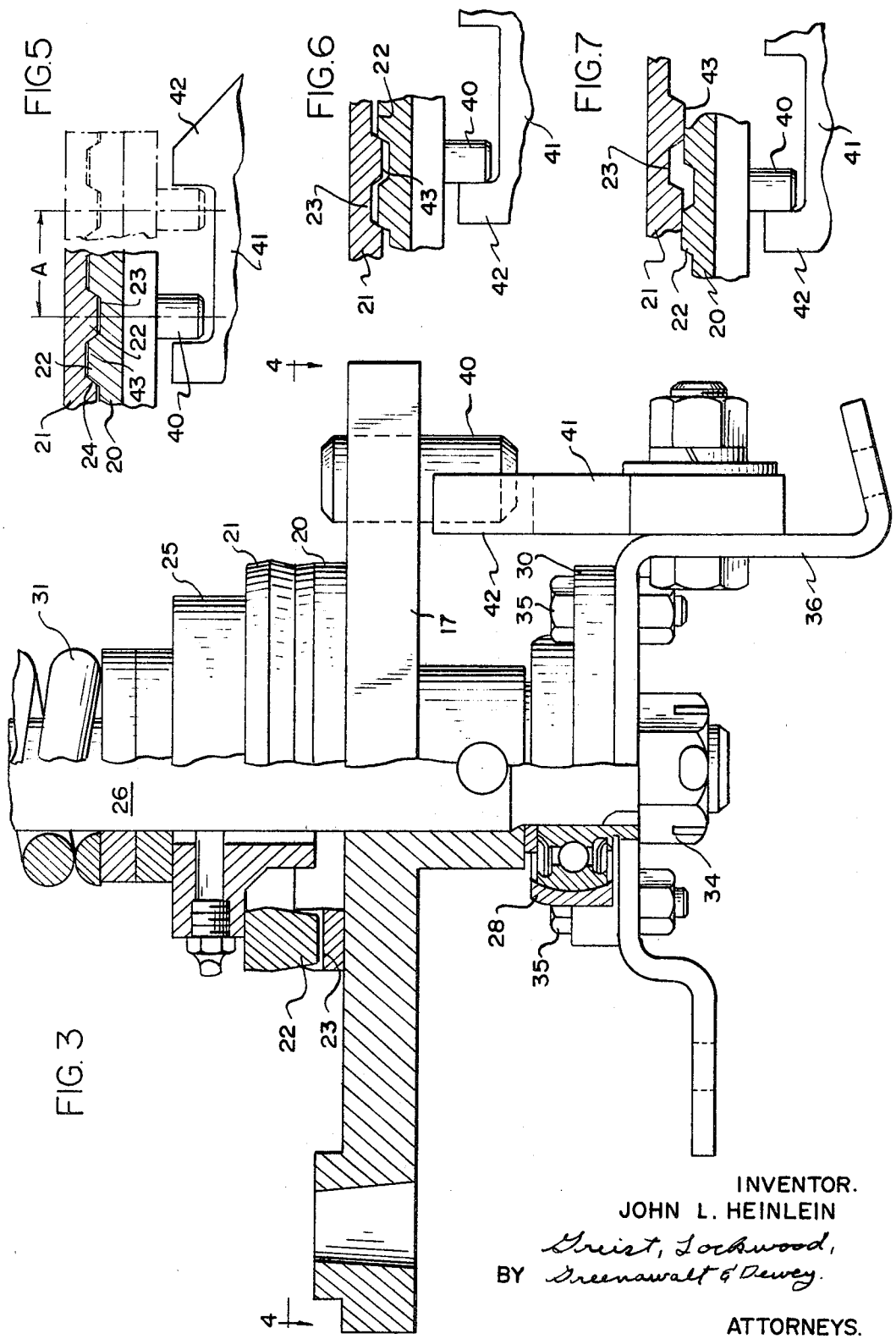

3,503,271
MOWING MACHINE DRIVE
John L. Heinlein, Shelbyville, Ill., assignor to Oliver Corporation, Chicago, Ill., a corporation of Delaware
Filed May 27, 1968, Ser. No. 732,331
Int. Cl. F16d 1/10; F16h 21/44
U.S. Cl. 74—44                              10 Claims

ABSTRACT OF THE DISCLOSURE

An improved mowing machine drive for use in a mower for mowing hay, cutting grain, or the like having a cutter bar with knife sections thereon and a bellcrank having one arm pivotally connected to the cutting member and the other arm pivotally connected to a pitman driver for reciprocating the bellcrank, the improvement residing in the provision of a clutch mechanism between the arms of the bellcrank which clutch mechanism upon clogging or jamming of the cutter bar or knife sections with foreign objects or material will cam out of driving engagement and on the reverse stroke of the pitman driver will move or drag the cutter bar away from the clogged or jammed position.

---

This invention relates to a mowing machine drive for use in mowing hay, cutting grain, or the like and particularly to a novel mowing machine drive which provides a self-cleaning mower.

Frequently in the use of mowers for mowing hay the cutter assembly becomes clogged or jammed with material or foreign objects. When this occurs the clogging material becomes wedged between the knife sections and/or the knife guards on the cutter bar and frequently the cutter bar and/or a knife section is damaged.

It is therefore the general object of this invention to provide a mower having a clutch mechanism between the two arms of a bellcrank drive connection to protect the knife bar from damage if it becomes clogged or jammed with material or a foreign object.

A further object is to provide a clutch mechanism of the type described which tends to unclog or free the cutter knife section.

Accordingly this invention comprises an improved mower of the type having a cutter bar with section knives thereon reciprocal in a knife guard, and a pitman driver, the improvement in the cutter bar driving means comprising a bellcrank having a first arm pivotally connected at one end to the cutter bar, a second arm pivotally connected to one end to the pitman driver, and a clutch means between and operably interconnecting the first and second arms in bellcrank relationship.

An important novel feature of this invention is the positioning of the clutch mechanism between the driven arm and the driving arm of the bellcrank. This unique positioning of the clutch mechanism eliminates variables that would occur if the clutch were placed in another position in the drive line. The positioning of the clutch mechanism between the arms of the bellcrank provides a self-cleaning feature which cannot be obtained by a clutch mechanism located on a rotary drive member. Consequently, clutch pressure to drive the cutter bar can be more accurately adjusted and maintained.

When the cutter bar becomes clogged or jammed the clutch mechanism comprising two jaw type clutch plates is actuated, i.e. movement of the cutter bar and driven arm in one direction is stopped while the driving arm continues its stroke causing the jaw type clutch plates to cam out of driving engagement. On the reverse stroke the jaw type clutch plates will frictionally move together or re-engage and move together and thereby move or drag the cutter bar in the other direction away from the clogged or jammed position. This movement in the other direction acts to relieve the clogging or jamming.

When the clutch mechanism is actuated the normal angular relationship of the arms of the bellcrank is changed. To prevent the arms of the bellcrank from re-engaging in a different angular position means are provided for limiting the stroke of the driven arm of the bellcrank. Thus when the jaws re-engage the normal angular relationship of the arms of the bellcrank will not be changed. This will prevent loss of knife section register with the knife guards. Furthermore the limiting means is arranged in such a manner that during normal operation of the mower the limiting means will not interfere with the normal movement of the driven arm.

Other objects and advantages of the invention will become apparent from the following description taken in connection with the accompanying drawings in which:

FIGURE 1 is a fragmentary top plan view of the cutter mechanism for a mower, including a conventional knife guard and cutter bar assembly driven from a conventional eccentric pitman driven through a bellcrank which includes a clutch and illustrating one embodiment of the invention;

FIGURE 2 is a side elevational view taken along the line 2—2 of FIGURE 1;

FIGURE 3 is an enlarged fragmentary view of the clutch mechanism shown in FIGURE 2;

FIGURE 4 is a sectional view of the clutch mechanism and the driven arm of the bellcrank taken along section line 4—4 of FIGURE 3;

FIGURE 5 is a fragmentary view showing the clutch plates in driving relationship;

FIGURE 6 is a fragmentary view showing the jaw teeth of one clutch plate being cammed out of the jaw recesses of the other clutch plate;

FIGURE 7 is a fragmentary view of the clutch mechanism showing the jaw teeth of each clutch plate separated from or cammed out of normal driving engagement.

Referring to FIGURE 1 a clutch mechanism is indicated generally at 10 in a bellcrank which drivingly interconnects a cutter assembly 11 and an eccentric-pitman assembly 12.

The cutter assembly 11 is of known type and comprises a cutter bar 13 with knife sections 14 reciprocating in a cutter guard 15. The cutter bar 13 is pivotally connected at 16 to a first or driven arm 17 of a bellcrank 18.

The clutch mechanism 10 (FIG. 3) comprises a first or lower clutch plate 20 and a second or upper clutch plate 21. Each clutch plate is preferably of the jaw type comprising alternate jaw teeth 22 and jaw recesses 23.

The adajcent ends of each tooth 22 and recess 23 are connected or bridged by a bevel surface 24 (FIG. 5) which facilitates separation, i.e. camming out, of the clutch plates 20, 21 when the clutch mechanism 10 is actuated. The first or driven arm 17 of the bellcrank is rigidly secured to the first clutch plate 20. The second clutch plate 21 is rigidly secured to the second or driving arm 25 of the bellcrank 18.

The clutch plates 20 and 21 and the arms 17 and 25 of the bellcrank 18 are journaled on a shaft 26. The shaft 26 is supported between an upper bearing 27 (FIG. 2) and a lower bearing 28 (FIG. 3). The upper bearing 27 is secured to an upper bearing plate 29 while the lower bearing 28 is secured to a lower bearing plate 30. Between the second or driving arm 25 and the upper bearing 21 there is disposed (under compression) a coiled spring 31 which releasably biases the clutch plates 20 and 21 into driving relationship.

If desired shim washers 32 can be interposed between the upper bearing 27 and the spring 31 to adjust the spring pressure and thereby the force required to actuate the clutch. Bearings 27, 28, bearing plates 29, 30, spring 31, bellcrank arms 17, 25 and clutch plates 20 and 21 are held in assembled relationship on shaft 26 by two nuts 33, 34 one on each end of the shaft. The lower bearing plate 30 is secured by suitable fastening means such as bolts 35 to a frame member 36 of the mower.

In the preferred embodiment of the invention the shaft 26 is disposed generally upright on the mower frame member 36 with the lower end of the shaft 26 extending through the frame member 36 and secured thereto by nut 34.

The driving or second arm 25 of the bellcrank 18 is driven by a pitman driver 37 which in turn is eccentrically connected by means of a journaled pin 38 to a crank wheel 39 of the crank wheel assembly 12. The crank wheel 39 is rotated by suitable power means of known type (not shown).

A stop pin 40 is secured to the first or driven arm 17 at one end thereof for engagement with the distal ends of a U-shaped abutment member 41 rigidly secured to said frame member 36. The distal ends 42 of the U-shaped abutment member 41 are disposed in the path of movement of the stop pin 40 to limit arcuate movement of the driven arm 17 in either direction.

During normal operation of the mower the stop pin 40 will not come into contact with the distal ends 42. When material or a foreign object becomes clogged or jammed in the cutter bar 13, movement of the cutter bar 13 and driven arm 17 in one direction is stopped. However, the pitman driver 37 continues its stroke thereby continuing movement of the driving arm 25. The jaw teeth 22 of upper jaw clutch plate 21 connected to drive arm 25 are then cammed out of the jaw recess 23 of clutch plate 20. The bevel surfaces 24 facilitate the camming out of the jaw teeth 22 (FIGS. 5–7).

When the jaw teeth 22 of clutch plate 21 are completely cammed out of the jaw recesses 23 in clutch plate 20 (FIG. 7) the outer surface 43 of jaw teeth 22 of clutch plate 21 may slidingly or frictionally engage the outer surface 43 of jaw teeth 22 of clutch plate 20. The frictional engagement would be caused by the pressure of spring 31 which urges the upper jaw clutch plate 21 against the lower clutch plate 20.

On the reverse stroke of the pitman drive 37 the driving arm 25 and the second or upper clutch plate 21 secured thereto are rotated in the other direction. Assuming the cutter bar is free to move in the other direction away from the clogged or jammed position, the reverse stroke of the pitman driver 37 either via the frictional contact between the outer surfaces 43 of the teeth 22 of the clutch plates 20 and 21 or via re-engagement of the clutch plates 20 and 21 will rotate the lower clutch plate 20 and the driven arm 17 secured thereto in the other direction thereby moving the cutter bar in the direction away from the clogged or jammed position. The driven arm 17 however, is not in its normal reciprocating position relative to the driving arm 25 when the clutch plates are out of driving engagement. Therefore, as driven arm 17 is being rotated in the other direction via frictional contact between the jaw teeth 22, the stop pin 40 will engage one of the distal ends 42. When this occurs, the jaw teeth 22 of the upper clutch plate 21 will slide or drop off of the jaw teeth 22 of the lower clutch plate 20 into the identical jaw recesses 23 of the lower clutch plate 20 occupied by the respective jaw teeth 22 of the upper clutch plate 21, before clogging or jamming of the cutter bar 13 occurred.

The extent of the camming out of the jaw teeth of the second or upper clutch plate 22 from the first or lower clutch plate 20 when jamming or clogging of the cutter bar occurs is determined by the extent of the angular movement of clutch plate 21 and the position of lower clutch plate 20 when jamming or clogging occurs. Of course, the extent of the angular movement of clutch plate 21 is determined by the length of the stroke of the pitman driver 37 and the location of the connection of the pitman driver 37 to the second arm 25. The arrangement and connection of these parts is so determined that if the lower clutch plate 20 is stopped at the beginning of its stroke in either direction the extent of angular movement of upper clutch plate 21 is such that the jaw teeth 22 of the upper clutch plate 21 will not slide or drop into the next or succeeding jaw recess 23 of the lower clutch plate 20. In other words, the jaw teeth 22 of the upper clutch plate 21 will not be moved, relative to the jaw teeth 22 of the lower clutch plate 20, much further past the position shown in FIGURE 7.

In order to make certain that the angular relationship (preferably 90°) of the driven arm 17 and driving arm 25 of the bellcrank 18 during normal operation of the mower is not changed, the spacing or distance between the distal ends 42 is chosen so that the arcuate movement of the driven arms 17 is limited to an angle less than the angle between radial center lines of two adjacent jaw teeth 22. Thus on the reverse stroke of the pitman driver 37 after jamming or clogging has occurred, the stop pin may be rotated into engagement with one of the distal ends 42. If this occurs the jaw teeth 22 of the upper clutch plate 21 will slide back into the jaw recesses 23 of the lower clutch plate 20 originally occupied by jaw teeth 22 of the upper clutch plate 21 before jamming occurred. In other words, the jaw teeth 22 of the upper clutch plate 21 will always be returned to the same jaw recesses 23 in the lower clutch plate 20 and the normal angular relationship of the arms 17 and 25 of the bellcrank will not be changed.

Referring to FIG. 4, angle A is the normal angle of travel of the arm 17 and angle B is the maximum angle of travel of the arm 17 when clogging or jamming of the cutter bar occurs. Angle C is the angle between radial center lines of adjacent jaw teeth 22.

In a preferred embodiment of the invention angle A is 44°, angle B is 48°, and angle C is 60°.

With the bellcrank relationship maintained constant, during normal operation of the mower, the position of the knife sections with respect to the knife guards will be maintained. Stated otherwise it will not be necessary to change the pre-adjusted register of the knife sections with respect to the knife guards, after jamming or clogging of the cutter bar is cleared.

It is important to note that with the clutch mechanism 10 arranged between the two arms 17 and 25 of the bellcrank 18, upon the reverse stroke of the pitman driver 37 after jamming occurs, the knife sections 14 and cutter bar 13 are moved away from the jammed or clogged position. This movement will often result in a cleaning or clearing of the clogged or jammed material or foreign object from the cutter bar.

On the other hand, if the material or foreign object is not cleared or removed from the cutter bar 13 when the knife section 14 moves away from the clogged or jammed position, then on the reverse stroke of the cutter bar 13 and the knife section 14 towards the clogged or jammed position, the knife section 14 will act as a reciprocating cutting knife. Repeated reciprocation of the knife section 14 will most likely result in cutting away or cutting through the clogging material or foreign object jammed or clogged in the cutter bar 13.

Thus, either by the moving away of the knife section from the jammed position or by the repeated cutting of the knife section 14 against the clogged or jammed material or foreign object a self-cleaning of the cutter bar 13 and knife sections 14 mounted thereon is obtained.

This self-cleaning feature of this invention not only protects the knife sections 14 and the cutter bar 13 from severe damage but also greatly reduces breakage and the maintenance usually necessary during operation of the mower. Furthermore the operator does not have to stop mowing each time the cutter assembly 11 is jammed or clogged to clean the cutter since by virtue of this invention the mower is essentially self-cleaning.

I claim:

1. In a mower of the type having a cutter bar with section knives thereon reciprocal in a knife guard and a pitman driver for reciprocating the cutter bar, the improvement comprising a cutter bar driving mechanism including a bellcrank mounted for movement about a generally vertical pivot axis and having a first arm and a second arm with the distal end of said first arm being pivotally connected to said cutter bar and the distal end of said second arm being pivotally connected to said pitman driver, and releasable clutch means between and operably interconnecting said first and second arms in a predetermined angular relationship, said releasable clutch means being adapted to disengage when said cutter bar becomes jammed to permit said pitman driver to complete its stroke in one direction without damage to said cutter bar and said knife guard while said cutter bar remains relatively stationary and then to permit said pitman driver on a reverse stroke to move said bellcrank and connected cutter bar in a direction away from the jammed position thereby tending to relieve the jammed condition, said pitman driver being positioned to deliver a reciprocating force at the distal end of said second arm at a point spaced from said pivot axis and said bellcrank transmitting this force to said cutter bar at the distal end of said first arm.

2. The improvement as claimed in claim 1 wherein said clutch means comprises a first clutch plate rigidly secured to said first arm, a second clutch plate rigidly secured to said second arm, and resilient means releasably biasing said clutch plates into driving relationship.

3. The improvement as claimed in claim 2 wherein said clutch plates are of the jaw type having alternating jaw teeth and jaw recesses.

4. The improvement as claimed in claim 3 wherein the adjacent ends of each jaw tooth and jaw recess in a clutch plate are bridged by a bevel surface which facilitates separation of the clutch plates.

5. The improvement as claimed in claim 2 wherein said first and second clutch plates and said first and second arms are arranged and disposed for rotation about said pivot axis, and means are provided for limiting the arcuate movement of said first arm about said pivot axis.

6. In a mower of the type having a cutter bar with section knives thereon reciprocal in a knife guard and a pitman driver for reciprocating the cutter bar, the improvement in the cutter bar driving means comprising a bellcrank having a first arm pivotally connected at one end to said cutter bar and a second arm pivotally connected at one end to said pitman driver, releasable clutch means between and operably interconnecting said first and second arms in bellcrank relationship, said clutch means including first and second clutch plates rigidly secured respectively, to said first and second arms, and resilient means releasably biasing said clutch plates into driving relationship, each of said clutch plates having alternating jaw teeth and jaw recesses with the adjacent ends of each jaw tooth and jaw recess being bridged by a bevel surface which facilitates separation of said clutch plates, said clutch plates and said arms being arranged for rotation about a common axis and means for limiting the arcuate movement of said first arm about said pivot axis, said limiting means including a stop pin and spaced abutment means, one of said stop pin and spaced abutment means being carried on said first arm and the other of said stop pin and spaced abutment means being stationarily mounted, and said stop pin and spaced abutment means being arranged so as to limit arcuate movement of said first arm to an angle less than the angle between radial center lines of two adjacent jaw teeth whereby when said cutter bar is jammed and said jaw teeth are cammed out of said jaw recesses they will not be moved into the succeeding jaw recesses, said jaw clutch plates will re-engage in their original position on the reverse stroke of said pitman driver, and the normal angular relationship of said arms will not be changed.

7. The improvement defined in claim 6 wherein the angle between radial center lines of adjacent teeth is approximately 60°, said stop pin is rigidly secured to said first arm, and said abutment means comprises a U-shaped member having two distal ends, said U-shaped member being fixedly mounted with respect to said first arm with the distal ends thereof adapted to be engaged by said stop pin, and the spacing between the distal ends is such that arcuate movement of said first arm is limited to approximately 48°.

8. The improvement defined in claim 6 wherein said arms, said clutch plates and said resilient means are journaled on a shaft which is supported on two bearings secured respectively in first and second bearing plates, and a nut is provided at each end of said shaft.

9. The improvement defined in claim 8 wherein said resilient means comprises a spring which surrounds said shaft and is positioned under pressure between said second arm and said second bearing so as to force said second clutch plates, connected to said second arm, into driving relationship with said first clutch plate.

10. The improvement defined in claim 9 wherein shim washers are provided between said spring and said second bearing for adjusting spring pressure.

References Cited

UNITED STATES PATENTS

| | | | |
|---|---|---|---|
| 410,190 | 9/1889 | Pitt | 74—44 |
| 1,262,479 | 4/1918 | Gardner | 74—44 |
| 1,512,478 | 10/1924 | Nelson | 74—44 |
| 1,840,682 | 1/1932 | Sheldrick et al. | 74—595 |

FOREIGN PATENTS 544,400   10/1955   Italy.

FRED C. MATTERN, Jr., Primary Examiner

WESLEY S. RATLIFF, Jr., Assistant Examiner

U.S. Cl. X.R.

74—595